Oct. 15, 1946.  E. BLETZ  2,409,414

HEATING APPARATUS

Filed July 8, 1942  2 Sheets—Sheet 1

WITNESSES:
Roy K. Enwall.
A. Dougherty.

INVENTOR
EDWARD BLETZ.
BY R. J. Eisinger
ATTORNEY

Oct. 15, 1946.   E. BLETZ   2,409,414
HEATING APPARATUS
Filed July 8, 1942   2 Sheets-Sheet 2

WITNESSES:
Roy K. Envall
E. H. Lutz

INVENTOR
EDWARD BLETZ.
BY
R. J. Eisinger
ATTORNEY

Patented Oct. 15, 1946

2,409,414

UNITED STATES PATENT OFFICE 2,409,414

HEATING APPARATUS

Edward Bletz, Lexington, Ohio, assignor to Westinghouse Electric Corporation, East Pittsburgh, Pa., a corporation of Pennsylvania Application July 8, 1942, Serial No. 450,135

1 Claim. (Cl. 219—20)

This invention relates to electric heating devices and more particularly to that type having a heating unit provided with a control for regulating the heat output of the unit, and it has for an object to provide an improved device of the character set forth.

In the art of cooking, many foods require a fast or rapid initial heating to bring the food to a predetermined temperature, such as the boiling point of water in the case of foods cooked in water, and then require less heat to maintain the food at that temperature. If too much heat is applied to the food after it has reached such predetermined temperature, not only is the food cooked improperly but a substantial amount of heat is wasted. It is, therefore, desirable to control the heat-supplying unit so that it brings the food to the predetermined temperature in a relatively short time and then supplies sufficient heat to the food to maintain it at that temperature.

It is, accordingly, a further object of this invention to provide an improved control system for a heating unit which comprises a plurality of heating elements, which control system causes the heating unit to operate at its normal maximum wattage input until the temperature of the food to be cooked or the material to be heated thereon reaches a predetermined value and then automatically reduces the wattage input to the heating unit to any desired value, as determined by the adjustment of the control system, to maintain the food at the proper temperature.

These and other objects are effected by my invention as will be apparent from the following description and claims taken in connection with the accompanying drawings, forming a part of this application, in which:

Figure 1:
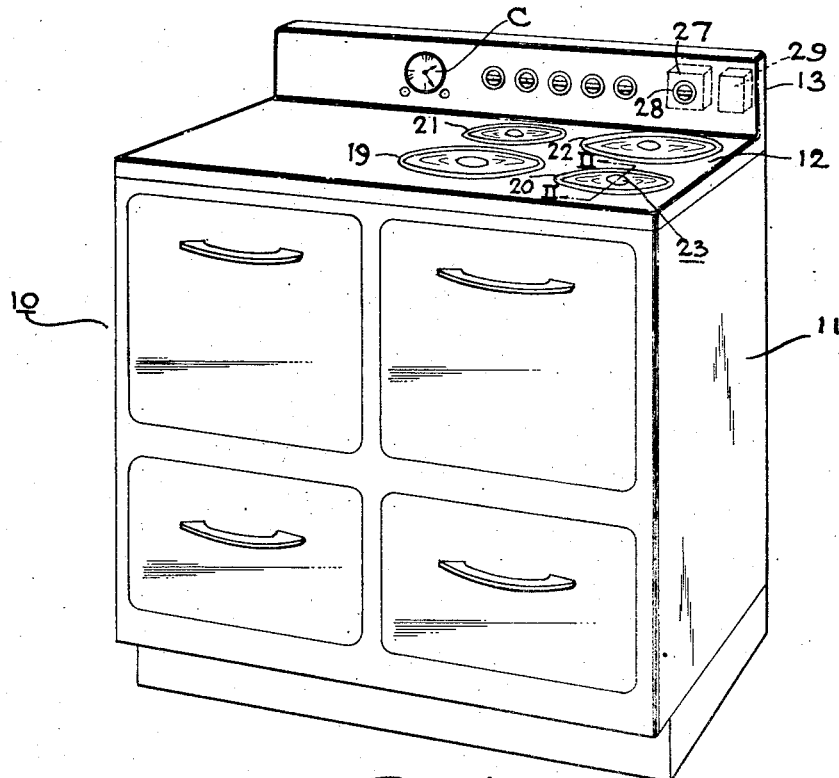
Fig. 1 is a perspective view of an electric cooking range in which the present invention is incorporated.

In the particular range illustrated in the drawings, three range surface units designated 19, 20, and 21 and a deep well cooker 22 are shown supported in the platform 12. However, the present invention is not concerned with the details of the range construction or the accessories therefor and for a clear understanding of the present invention specific reference will only be made hereafter to the surface unit 20. It will be understood that the operation of the surface units 19 and 21, as well as the deep well cooker unit 22, may also be controlled in the manner to be described in connection with the surface unit 20.

Figure 2:
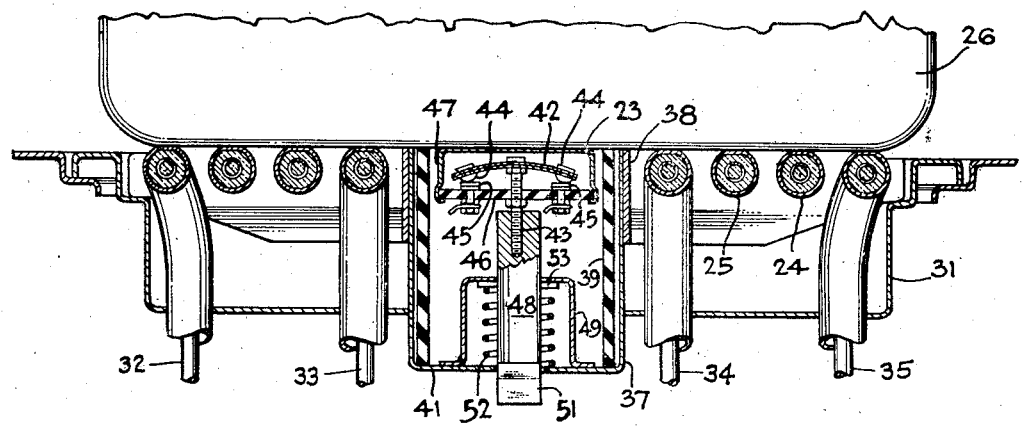
Fig. 2 is a vertical section through one of the surface units of the range illustrated in Fig. 1, the section being taken substantially on the line II—II of Fig. 1 and showing a cooking vessel thereon.

The control system for the surface unit 20 includes a thermostat 23, Fig. 2, thermally insulated from heating elements 24 and 25 of the surface unit 20 and supported in a position to be heated by a cooking vessel, such as 26, placed on the surface unit. The control system also includes a manually-adjustable multiple-position switch 27 which is conveniently mounted at the rear of the backsplasher 13 and adjusted by means of a knob 28. The thermostat 23 and switch 27, together with a thermal relay 29, control electrical circuits for the heating elements of the surface unit in such a way that the unit receives full wattage input until the cooking vessel reaches a temperature determined by the thermostat 23 and thereafter the wattage input to the unit is decreased to any desired value depending on the adjustment of the switch 27 to provide heat sufficient to at least maintain the vessel at that temperature.

Figure 3:
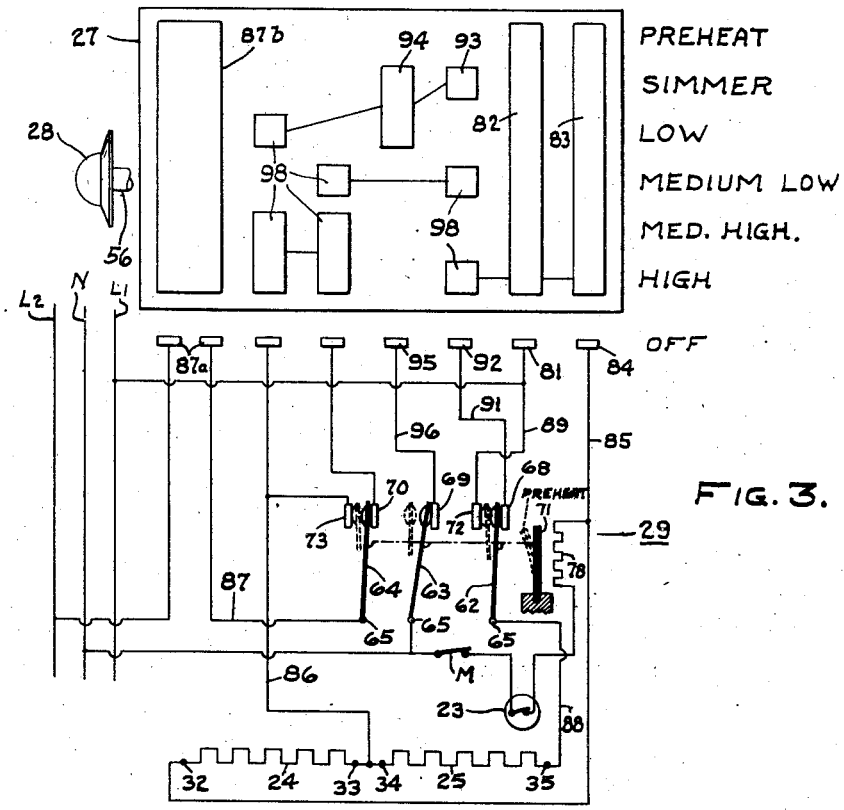
Fig. 3 is a diagram of the electrical circuits of the present control system employed for the surface unit illustrated in Fig. 2, showing the position of the several switches when the circuits are deenergized.

The range surface unit 20 comprises two flat, spiral heating elements, preferably of the armored type, which are supported within an opening formed in the range platform 12 and provided with the usual reflector pan 31. While two heating elements have been shown it is to be understood that a greater number may be provided if desired. The heating elements 24 and 25 are provided with the terminals 32, 33 and 34, 35, respectively, the terminals 33 and 34 being connected together as shown in the diagram of Fig. 3.

The thermostat 23 is supported within the center of the surface unit by means of a U-shaped metal strap 37 welded to a ring 38 of the heating element supporting structure. A sleeve 39 of heat-insulating material surrounds the thermostat and rests on the cross bar 41 of the U-shaped strap 37 and is secured to the ring 38 by means of screws or the like. The insulating sleeve 39 substantially thermally insulates the thermostat from the heating elements 24 and 25 and their supporting structure.

The temperature-responsive portion of the thermostat 23 may be of conventional construction and is here shown as comprising a bimetal disc 42 of the snap-acting type. This disc is supported at its center by an adjusting screw 43, and carries contacts 44 which are preferably insulated from the disc but are connected to each other by means of a suitable conductor. When the temperature of the disc is below its critical or snap-over temperature, it is in the position shown in Fig. 2 and the contacts 44 bridge fixed contacts 45 carried by a base plate 46 mounted on the thermostat adjusting screw 43. It will be understood that the disc 42 may be adjusted to snap over at different temperatures by means of the screw 43.

The bimetal disc 42 is enclosed by a cap 47 which is preferably made of good heat-conducting material such as aluminum or the like. The rim of this cup is flanged in the manner shown in Fig. 2 so that it may be detachably secured to the base plate 46.

The adjusting screw 43 of the thermostat 23 is threaded into a vertically-extending rod 48. This rod extends slidably through an opening formed in a guide bracket 49 secured to the cross bar 41. The rod 48 is biased upwardly by means of a compression spring 52 which engages a pin 53 extending through the rod.

The top of the thermostat 23 is normally held above the plane of the top of the surface unit by the spring 52 and the spring permits the thermostat to be moved downwardly by a cooking vessel placed thereon as shown in Fig. 2, so that good thermal contact between the vessel and the thermostat is assured.

The particular thermostat disclosed above and the manner of mounting it is similar to that disclosed in my copending application, Serial No. 406,781, filed August 14, 1941, for Heating apparatus, and assigned to the assignee of the present application. However, the invention is not limited to the use of the particular thermostat illustrated. For example, the thermostat disclosed in the application of Earl K. Clark, Serial No. 438,887, filed April 14, 1942, may be employed.

The switch 27, as shown in Fig. 3, is preferably of the type having seven positions and adjustable to provide five different degrees of heat for the heating elements. The switch is movable to the several positions by the knob 26 and its switch shaft 56. The switch 27 may generally be of any well-known construction and is here shown as a drum switch, the rotatable element of which is shown developed in Fig. 3. This switch is movable to an "off" position, as shown in Fig. 3, and to six active positions which are indicated "high," "medium high," "medium low," "low," "simmer," and "preheat." Adjustment of the switch 13 from the "off" position to its various active positions connects the elements 24 and 25 singly or in different series or multiple arrangements across different voltages of a three-wire supply system, $L_1$, $L_2$ and neutral N, for providing various degrees of heating except when the thermostat 23 and a manual switch M are closed. While the invention is not limited thereby, it is proposed to use a conventional Edison three-wire, 220-volt supply system and heating elements capable of being continuously energized at 220 volts. Further reference to the various connections of the elements 24 and 25 to the conductors $L_1$, $L_2$, and N will be made hereinafter.

In accordance with my invention, the transfer relay 29 is associated with the switch 13 and the thermostat so that when the thermostat is closed the elements 24 and 25 are connected in parallel across the line conductors $L_1$ and $L_2$, and when open this relay transfers the control of the heating elements 24 and 25 back to the switch 27 to automatically provide a preselected wattage input to the heating elements.

The transfer relay as shown particularly in Figs. 4 to 8, inclusive, comprises a base plate 61, of insulating material, on which are mounted three reversely bent spring arms 62, 63 and 64. These spring arms serve as conductors and are secured to the base plate by means of terminal screws 65. The free ends of the outer springs 62 and 64 are provided with double contacts, as shown at 66 in Fig. 7, while the central spring 63 is provided with a single contact 67 on its upper surface.

Figures 4, 5, 6:
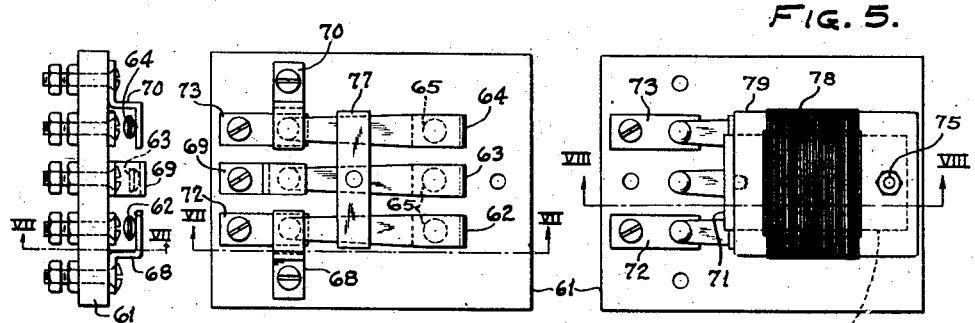
Figs. 4 and 5 are plan views of a transfer relay forming part of the present invention, the heater and bimetal being omitted from Fig. 4 and several of the contacts being omitted from Fig. 5, for the sake of clarity.
Fig. 6 is an end view looking from the left of Fig. 4.
Figures 7, 8:
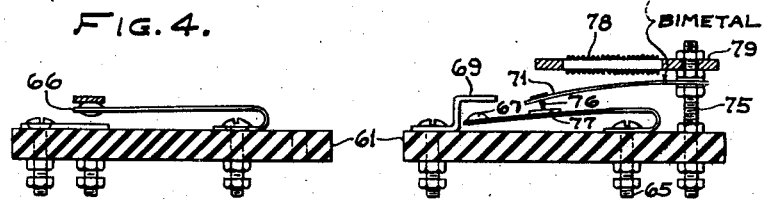
Fig. 7 is a sectional view taken substantially on the lines VII—VII of Figs. 4 and 6; and, Fig. 8 is a sectional view taken substantially on the line VIII—VIII of Fig. 5.

The springs 62, 63 and 64 are arranged so that they are normally biased upwardly, in the manner shown in Figs. 6 and 7, with the contacts on the upper surfaces thereof in engagement with the overhanging terminal members 68, 69 and 70, respectively. However, these spring members are movable downwardly by means of a bimetal strip 71, when the latter is heated, to bring the contacts carried on the undersurface of the outer springs 62 and 64 into engagement with terminal straps 72 and 73, respectively. By reference to Fig. 8, it will be noted that in the down position of the springs, the central spring 63 does not engage any terminal.

The mentioned bimetal 71 is insulatedly secured at one end to a vertical terminal screw 75 carried by the base plate 61 and is provided at its free end with a pin 76 adapted to engage a strap 77 overlying the three springs 62, 63 and 64, and which may be fixed to the central spring 63. This bimetal element is adapted to be heated by means of a resistance heater 78 connected in series with the thermostat, as shown in Fig. 3, and wound on an insulating plate 79 carried by the terminal screw 75 above the bimetal element.

By reference to Fig. 3, it will be noted that when the thermostat 23 is closed, the small heater 78 is energized and causes the bimetal 71 to deflect downwardly and move the spring conductors 62, 63 and 64 downwardly away from the overhanging terminal strips 68, 69 and 70, and bring the contacts on the outer springs 62 and 64 into engagement with the terminal straps 72 and 73. When the thermostat opens, as when the vessel 26 reaches the predetermined temperature, the heater 78 is deenergized allowing the bimetal 71 to cool with the result that it moves upwardly to permit the spring conductors 62, 63 and 64 to again assume the position shown in Fig. 6.

*Operation*

To use the present control, the operator merely turns the knob 26 to select the heat input necessary to complete the cooking operation when the vessel and the food therein have reached the boiling point. Assume, for example, that the switch 27 is set at "simmer." As soon as the switch 27 is turned from its "off" position to the "simmer" position, or any of the active positions of the switch 27, a circuit is completed for the heater 78 of the transfer relay 29 since the thermostat 23 is cold and, therefore its switch is closed.

The circuit for the heater 78 is traceable from line conductor $L_1$, fixed contact 81 of the switch 27, connected segments 82 and 83, fixed contact 84, conductor 85, through the heating element 78 and closed contacts of the pilot thermostat 23 to the neutral conductor N. With the heater 78 energized, the bimetal 71 is heated thereby and deflects and forces the spring conductors 62, 63 and 64 to the left, as viewed in Fig. 3, so that the springs 62 and 64 engage the terminal straps 72 and 73 of the transfer relay. It will be noted that with the transfer relay in this position the heating elements 24 and 25 are connected in multiple across the line conductors $L_1$ and $L_2$ to provide maximum or high heat. The circuit for the heating element 24 may be traced as follows: From the line conductor $L_1$ to the fixed contact 81, electrically connected segments 82 and 83, fixed contact 84, conductor 85 to the terminal 32, heating element 24, conductor 86 to terminal strap 73, spring conductor 64 and conductor 87 to the line conductor $L_2$. The conductor 87 is connected to $L_2$ through contacts 87a which are bridged by segment 87b when the switch 27 is at any of its active positions.

When the vessel and its contents reach the temperature at which the thermostat 23 snaps open, the heater 78 of the transfer relay is de-energized and permits the bimetal element 71 to cool so that the spring conductors 62, 63 and 64 then move to the right, as viewed in Fig. 3, to the full line position shown in that figure to bring the contacts carried thereby into engagement with the terminal members 68, 69 and 70, respectively. As mentioned above, it has been assumed that the switch 27 is set to continue the cooking of the food at "simmer" heat, which is the lowest heat obtainable. This setting of the switch connects the two heating elements 24 and 25 in series between the neutral conductor and one of the main supply conductors. This circuit is traceable from the line conductor $L_1$ to the contact 81, segments 82 and 83, contact 84, conductor 85, through the heating elements 24 and 25, conductor 88, spring conductor 62 which now engages the terminal 68, conductor 91 to contact 92 of the switch 27, electrically-connected segments 93 and 94, fixed contact 95, conductor 96 to the terminal member 69, spring conductor 63 to neutral of the circuit. When the food has been cooked, the operator turns the switch 27 to "off."

While a single cycle of operation has been described it will be understood that by turning the selector switch 27 to its other active positions, circuits similar to that described in detail above will be set up for the heating elements 24 and 25 by means of the several segments, generally indicated 98, to provide different wattage inputs to the surface unit after the food has been preheated under the control of the pilot thermostat 23.

Thus, with the switch 27 set at its "high" heat position, the heating elements, which may, for example, be 230 volt elements, are energized in parallel by the line conductors $L_1$ and $L_2$ which, as is well understood in an Edison three-wire system, are each energized at 230 volts.

When the switch 27 is adjusted to its "medium high" heat position, the heating element 24 alone is energized at 230 volts by the line conductors $L_1$ and $L_2$, so that the heat generated in the "medium high" position is just half of the heat generated during the "high" position.

Adjustment of the switch 27 to its "medium" position connects the heating element 24 and 25 in series across the line conductors $L_1$ and $L_2$, so that the heat generated in this position is one-quarter of the "high" heat afforded.

Movement of the switch to its "low" position connects the heating element 24 across the line conductors $L_1$ and neutral N, which in the system described, provides a potential of 115 volts. In this position, the watts dissipated or the heat generated by the element 24 is one-eighth of the maximum wattage or heat generated in the "high" position. In the "simmer" position of the switch 27, the elements 24 and 25 are connected in series across conductor $L_1$ and neutral N so that the heat generated is one-sixteenth of the "high" heat afforded.

If it is desired to use the surface unit in the conventional manner, that is, without the automatic preheat obtainable with the thermostat 23, manual switch M, which may be conveniently mounted on the backsplasher, may be opened.

In the event it is desired merely to utilize the thermostat to bring a vessel of food up to the boiling point, the selector switch 27 may be set at its "preheat" position which allows the heating elements 24 and 25 to be energized at maximum wattage until the thermostat 23 opens, and thereafter the heating elements will be automatically deenergized and remain so until the thermostat drops to its switch-closing temperature.

To obtain fully automatic control of the surface unit 20, the circuits for the heating elements 24 and 25 may be controlled by means of a time clock "C" to establish and subsequently open these circuits at given times as determined by the setting of the clock controls. The clock may be of any approved construction, such as used with range ovens, and since the details thereof and the manner in which it may open and close such circuits are well known, it need not be further described.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In an electrically-heated cooking device, the combination of a plurality of electrical heater elements for heating a vessel adapted to contain food, supply conductors for supplying electrical energy to said heater elements, a selector switch movable to an "off" position and to a plurality of operating positions, a transfer switch movable to a normal position and to a preheat position, said selector switch and said transfer switch being connected in series with each other and with at least one of said heater elements in a plurality of operating positions of said selector switch, said switches being so constructed and arranged and connected to said supply conductors and said heater elements in such manner that, whenever said selector switch is in any one of a plurality of operating positions and said transfer switch is in said preheat position each of said heater elements is connected across the supply conductors of maximum voltage, and that, whenever said transfer switch is in its normal position said selector switch is effective in its different operating positions to effect various circuit connections between said supply conductors and said heater elements to provide various rates of heat delivery to the cooking appliance including one position in which each of said heater elements is connected across the supply conductors of maximum voltage, said selector switch being adapted to cause all the heater elements to be substantially deenergized when in the "off" position, and means for actuating said transfer switch to its normal position in response to increase in temperature of said vessel above a predetermined value, said means comprising a heating element, a thermostatic member subjected to heat from said heating element and adapted to actuate said transfer switch to its preheat position when said heating element is energized and to its normal position when said heating element is not energized, and a thermostatic switch adapted to effect deenergization of said heating element in response to increase in temperature of said vessel above said predetermined value.

EDWARD BLETZ.